(12) United States Patent
Daynès et al.

(10) Patent No.: US 7,584,231 B1
(45) Date of Patent: Sep. 1, 2009

(54) METHODS FOR DETERMINING A SAFE END OF SCAN FOR GENERATIONAL GARBAGE COLLECTION

(75) Inventors: Laurent Daynès, Saint-Ismier (FR);
Andrew McClure, Lafayette, IN (US);
Grzegorz J. Czajkowski, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 292 days.

(21) Appl. No.: 11/442,374

(22) Filed: May 25, 2006

(51) Int. Cl.
*G06F 12/00* (2006.01)
(52) U.S. Cl. .................. 707/206; 711/136; 711/165
(58) Field of Classification Search ............... 707/206
See application file for complete search history.

(56) References Cited

U.S. PATENT DOCUMENTS

| | | | | |
|---|---|---|---|---|
| 5,960,087 A | * | 9/1999 | Tribble et al. | 713/167 |
| 6,216,212 B1 | * | 4/2001 | Challenger et al. | 711/163 |
| 6,826,583 B1 | * | 11/2004 | Flood et al. | 707/206 |
| 6,928,460 B2 | * | 8/2005 | Nagarajan et al. | 707/206 |
| 6,978,285 B2 | * | 12/2005 | Li | 707/206 |
| 2004/0111448 A1 | * | 6/2004 | Garthwaite | 707/206 |

OTHER PUBLICATIONS

Author: Ole Agesen Title: GC Points in a Threaded Environment Date: Dec. 1998 Publisher: Sun Microsystems Pertinent pp. 1-23 (whole document as in attached pdf file).*
Author: Terence Critchlow; Title: A Distributed Garbage Collection Algorithm; Date: Aug. 1992; Publisher: University of Utah; Pertient pp. 1-64.*
Author: Lee et al.; Title: A Pure Reference Counting Garbage Collector; Date: 2001; Publisher: University of Colorado; Pertinent pp. 1-50.*

* cited by examiner

*Primary Examiner*—Shahid A Alam
*Assistant Examiner*—Anh Tai V Tran
(74) *Attorney, Agent, or Firm*—Martine Penilla & Gencarella, LLP (57) ABSTRACT

A method is provided enabling concurrent garbage collection of a young generation of a task with other tasks executing in a multi-tasking virtual machine. A first record is provided for each thread which has a value in an old generation memory after each thread successfully allocates an object in the old generation memory. A second record is provided for each thread which has a memory address value. Threads of a garbage-collecting task are stopped and an end of scan value for the task is calculated. Garbage collection on threads associated the garbage-collected task are permitted when one of two conditions involving either second records or second records and first records are met.

7 Claims, 4 Drawing Sheets

FIG. 4B

METHODS FOR DETERMINING A SAFE END OF SCAN FOR GENERATIONAL GARBAGE COLLECTION

BACKGROUND

Generational garbage collection is a garbage collection (GC) technique that works by dividing the heap into two or more generations, each generation corresponding to a specific object "age", wherein the age of an object is the time spent since the allocation of the object. Objects are allocated in the youngest generation, and move to older generation when their age grows beyond a given threshold. This "promotion" to the old generation is typically performed upon a collection of the young generation. Programming languages that use a generational collector support the generational hypothesis that most objects die young and thus GC activity is mostly made of young generation collections. These are typically much faster than performing GC over the whole heap since they only require scanning the live objects of the young generation, which is typically a small fraction of the whole heap.

In a multi-tasking environment, assigning a private young generation to each task enables one to clearly account the cost of young generation collections of a single task, while making the time performing a young generation collection proportional only to the number of young lived objects allocated by that task.

Figure 1:
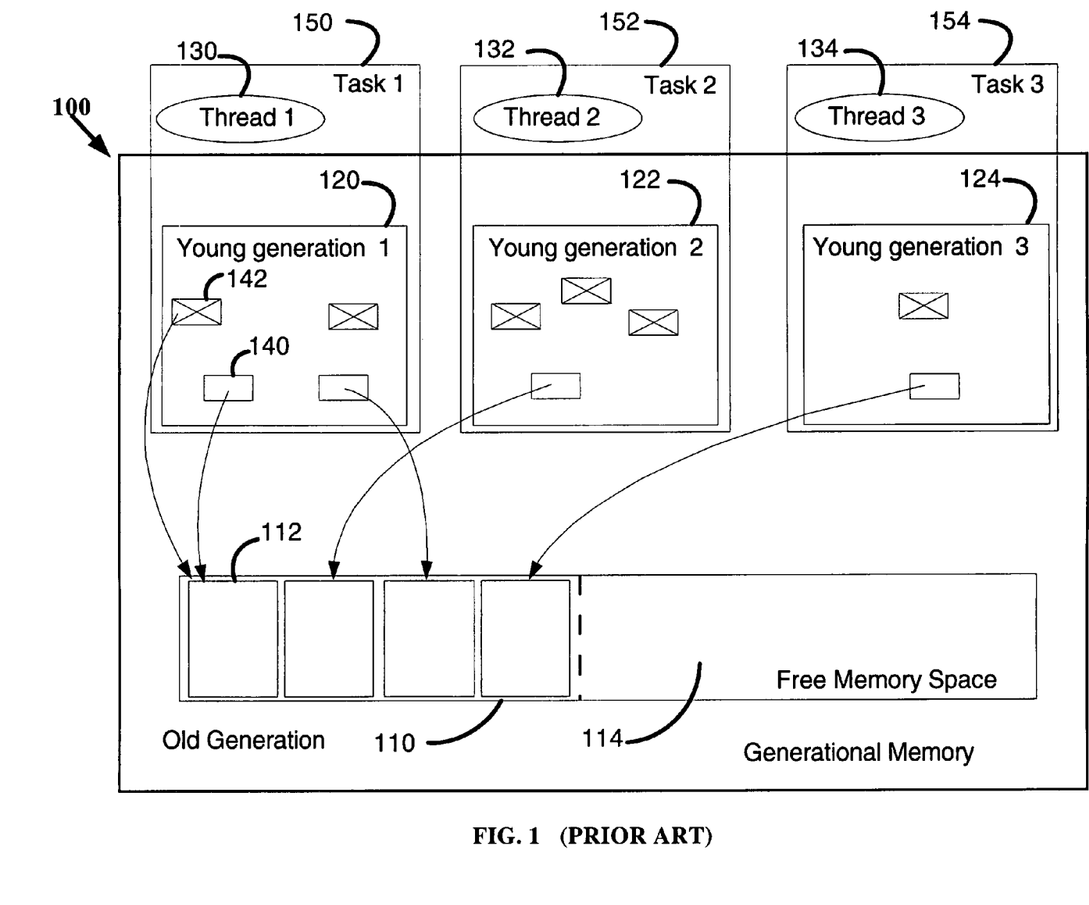
FIG. 1 is a high level diagram of a prior art generational garbage collection scheme.

FIG. 1 is a high level diagram of a prior art generational garbage collection scheme 100 in which a heap memory for a multi-tasking environment is divided into an old generation memory 110 which is shared by multiple tasks, and young generation memories 120, 122, and 124. Young generation memories 120, 122, and 124 belong respectively to task 150, 152, and 154 of the multi-tasking environment. Threads 130, 132, and 134 execute on behalf of separate, individual tasks and allocate objects in the young generation of their task. Old generation memory 110 contains multiple objects of multiple tasks and a free memory space 114 which does not contain any objects. Young generation memory 120 contains live object 140 which contains a reference to object 112 in old generation memory 110. Young generation memory 120 also contains dead object 142. When garbage collection is conducted on young generation memory 120, the memory allocated to dead objects it contains is released while preserving any live objects within young generation memory 120.

Typically, garbage collection occurs by "stopping the world", in other words, by suspending all mutator threads at points where all locations to object references are known. This approach, however, has a negative impact on throughput especially in a multi-tasking environment, since the threads of all running tasks are prevented from making progress although only one of these tasks needs scavenging.

Because threads of tasks other than the one performing the young generation collection cannot mutate any of the objects of the scavenging task, it should be possible to allow threads of all tasks other than the collecting task to execute concurrently to the young generation collection. However, allowing collection of the young generation of one task concurrently to the execution of other running tasks raises several problems. One potential source of problems is that threads of other tasks may allocate objects directly into the old generation while the young generation GC determines the set of references from objects in the old generation to objects of the young generation being collected. Allocations directly in the old generation can happen for several reasons: because an object is too large to fit in the young generation; because the object is known to be long-lived by the VM; or because the object can be safely shared across multiple tasks (for instance, an immutable string) in order to optimize space usage. These concurrent allocations may be problematic if the implementation of generational GC uses an imprecise write-barrier implementation, such as those based on card tables. A write barrier is a runtime mechanism that performs (potentially conditionally) an action upon every write to an object. In the case of generational GCs, the write barrier performs some action to keep up-to-date a remembered set of the locations in the old generation that contain a reference to a young generation. The remembered set is used during a young generation GC as part of its set of roots.

One of the most popular implementation of remembered sets uses card tables. This consists of dividing up logically the heap space into regions called cards, whose size is a power of two. An array of card states keeps track of what cards may contain a reference to a young generation. Card states are typically a two-valued byte value: dirty or clean. Given these data structures, a write barrier consists simply of right-shifting the address of the memory location where a reference is to be written to obtain an index to the array of card states, and write the states to dirty. Thus, the write barrier cost between 2 to 4 instructions, depending of the implementation detail in a particular virtual machine and processor architecture. The information recorded in card tables is imprecise with respect to the exact location of reference. So a young generation GC determines its set of roots by scanning the array of card states to find dirty cards, and scan all the objects in the dirty cards for references into the young generation.

Scanning of dirty cards by a young generation GC performing on behalf of one task while allowing other task to perform allocation to the old generation concurrently is problematic because a card may contains one or more object allocated by concurrent task that are not fully initialized yet. This is problematic because linear scanning of a portion of the old generation relies on precisely determining the size of the objects being scanned, which in turn requires objects to be fully initialized (so that their type can be determined, and therefore, their size).

What is needed is a method for determining a consistent end-of-scan position in the old generation memory such that a scavenging task is guaranteed to scan only fully initialized objects.

SUMMARY

Embodiments of the present invention provide concurrent garbage collection of a young generation of a task with other tasks executing in a multi-tasking virtual machine.

It should be appreciated that the present invention can be implemented in numerous ways, such as a process, an apparatus, a system, a device or a method on a computer readable medium. Several inventive embodiments of the present invention are described below.

In one embodiment, a method enabling concurrent garbage collection of a young generation of a task with other tasks executing in a multi-tasking virtual machine begins by providing a pointer whose value references a free space memory address in an old generation memory. The pointer value determines an end of scan value for a task before garbage collection of the young generation of the task. A counter of ongoing object initializations is provided as well. The counter is atomically incremented before an object allocation in the old generation memory and atomically decremented after an object initialization in the old generation memory. Threads of a garbage-collecting task are stopped and wait until the counter of ongoing object initializations is zero before garbage collection of the young generation of the task is started.

In another embodiment, a method enabling concurrent garbage collection of a young generation of a task with other tasks executing in a multi-tasking virtual machine begins by providing a record for each thread of a task. The record has a value which records a free space memory address in an old generation memory after each thread of a task successfully allocates an object in the old generation memory. Next, an end of scan value is calculated for the task before garbage collection of the young generation. The end of scan value is calculated from the maximum of record values of threads associated with a garbage-collecting task when those threads are stopped. A counter of ongoing object initializations is provided in the method. The counter of ongoing object initializations is atomically incremented before an object allocation in the old generation memory and is atomically decremented after an object initialization in the old generation memory. Then, all threads of a garbage-collecting task are stopped. Before starting garbage collection of the young generation of the task, the method waits until the counter of ongoing object initializations has a zero value.

In yet another embodiment, a method enabling concurrent garbage collection of a young generation of a task with other tasks executing in a multi-tasking virtual machine begins by providing a first record for each thread of a task. The first record has a value recording a free space memory address in an old generation memory after each thread of a task successfully allocates an object in the old generation memory. Next, a second record is provided for each thread of a task. The second record has a value recording a memory address value of an object following a last old generation object fully initialized by each thread of a task. The method proceeds with stopping all threads of a garbage-collecting task. An end of scan value is then calculated for the task before garbage collection of the young generation of the task. The end of scan value is calculated from a maximum first record value from threads associated with the garbage-collecting task. Afterwards, garbage collection on threads associated with the garbage-collected task is permitted when either of two conditions occurs: when second records for threads not associated with the garbage-collecting task are greater than the end of scan value for the garbage-collecting task or when second records are greater than or equal to first records for threads not associated with the garbage-collecting task.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The present invention relates to determining a consistent end-of-scan position in an old generation memory. The methods presented determine a safe end of scan position so that garbage collection may be run concurrently with other tasks in a multi-tasking virtual machine. In the embodiments described, the end of scan position is chosen so that all objects allocated in the old generation on behalf of the task requesting the young collection GC reside before the end of scan position. This is necessary in order to guaranty that no live objects are considered garbage. Furthermore, all objects from the beginning of the old generation up to the end of scan position are fully initialized (i.e., their meta-data are all current). The embodiments of the invention allow an end-of-scan position to be chosen, as much as possible, to avoid scanning space unnecessarily with goal that ideally the last object before the end-of-scan position should be the last object allocated by the collecting task before garbage collection.

It will be obvious, however, to one skilled in the art, that the present invention may be practiced without some or all of these specific details. In other instances, well known process operations have not been described in detail in order not to unnecessarily obscure the present invention.

Figure 2A:
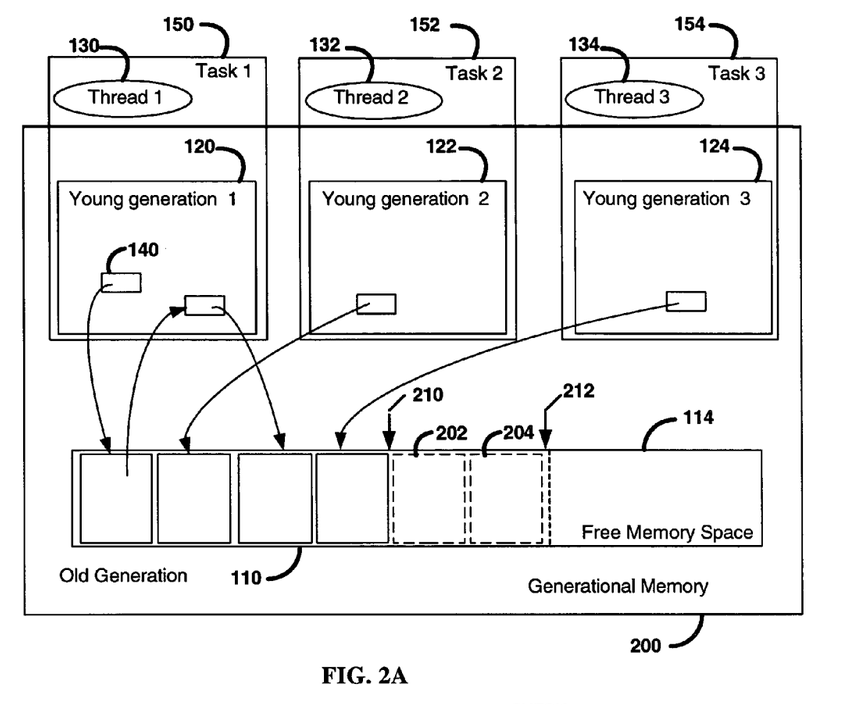
FIG. 2A is a conceptual diagram of a generational memory employing a pointer which references the free space of the old generation memory as a scanning boundary, in accordance with one embodiment of the present invention.

FIG. 2A is a conceptual diagram of generational memory 200 employing a pointer which references the memory address of free space in the old generation memory, in accordance with one embodiment of the present invention. Generational memory 200 operates in cooperation with an implementation of a multi-tasking virtual machine which permits multiple tasks to be processed. It is understood that the multi-tasking virtual machine may be one of a plurality of virtual machines operating in a computer system.

Still referring to FIG. 2A, generational memory 200 is divided into multiple young generation memories, one for each running task, and old generation memory 110 shared between all tasks. Young generation memories 120, 122, and 124 and old generation memory 110 may each be located in a computer system's virtual or physical memory. Threads allocate space for object primarily in the young generation of the task on behalf of which they are running. Although FIG. 2A illustrates a task having a single thread associated with the task, it should be understood that a task may have multiple threads associated with it and that the multiple threads of the task all allocate objects in the young generation memory associated with the particular task.

Allocation in old generation memory 110 follows a linear allocation scheme: a pointer records the beginning of a contiguous area of free space. The incrementing of the pointer by the requested number of bytes is performed atomically by mutators. Referring to back to FIG. 2A, this is depicted by memory address 210 which is referenced by a free space pointer. After object 202 of thread 132 and object 204 of thread 134 are successfully allocated in old generation memory 110, the free space pointer will reference memory address 212. In this manner, the free space pointer is continually updated to reference the free space memory address in the old generation memory 110.

Since a young generation GC runs in mutual exclusion with all threads of the task being collected, fulfilling the condition that all objects allocated by the task being collected reside before the end-of-scan position is trivial: any value of the free pointer read by the young generation GC fulfills the first condition. It is, however, best to obtain the lowest possible value of the free pointer in order to avoid scanning portions of the old generation that do not contain references to the collected young generation. Thus, the value of the free pointer should be recorded as soon as all threads of the task being collected are stopped.

In accordance with one embodiment of the present invention, a condition required in order for the scanning of the old generation by a young generation GC to work in generational memory 200 is that all objects from the beginning of the old generation up to the end of scan position must be fully initialized (i.e., their meta-data must be current). This can be satisfied by a mechanism that keeps track of ongoing object initialization in the old space using a counter. When a mutator thread allocates to the old generation, it atomically increments a counter immediately before attempting to atomically update the free pointer. If the atomic increase of the free pointer fails, the counter must be atomically decremented. If the atomic increase of the free pointer succeeds, the object has been allocated, and the mutator thread decreases the counter atomically once it has fully initialized the allocated object. The counter records how many partially initialized objects exist in the old generation. If the young generation GC reads a counter value of 0, it is guaranteed that all the objects before its end of scan position are fully initialized, hence that it can safely scan any portion of the old generation up to the end of scan position. It should be noted that it is important that the end-of-scan position is determined before reading the counter value. If the counter has a value greater than 0, the GC must wait until its value drops down to 0, either by busy looping on a multi-processor system, or by yielding the CPU so that ongoing initialization can proceed.

Figure 2B:
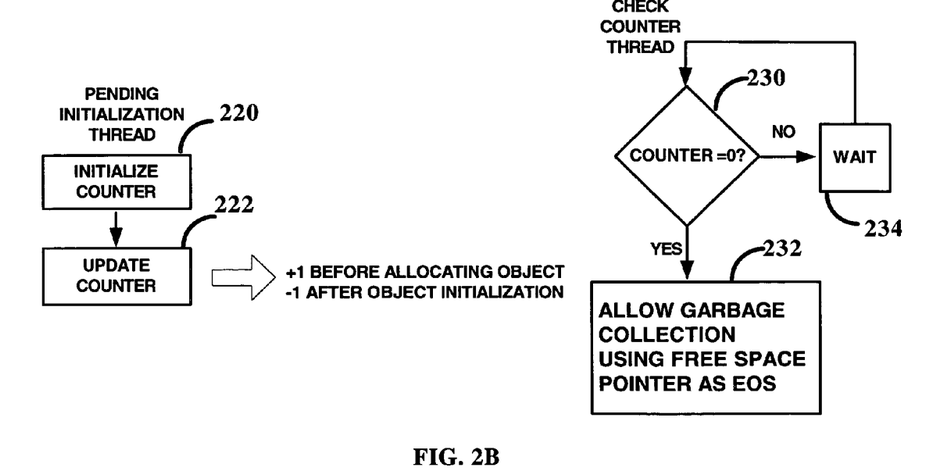
FIG. 2B is a flowchart detailing thread operations which regulate garbage collection on the generational memory of FIG. 2A, in accordance with one embodiment of the present invention.

FIG. 2B is a flowchart detailing thread operations which regulate garbage collection on the generational memory 200. Old generation memory 110 is associated with a counter of ongoing initialization of allocated objects. The counter is initialized to 0 when the old generation memory is initialized, before any allocations to the old generation memory. A mutator thread updates the counter of the number of ongoing object initializations wherein the counter is incremented atomically just before allocating an object in the old generation, and decremented atomically just after the object initialization is completed. In operation 220, a counter variable which will contain a counter value representing the number of ongoing object initializations is initialized before any allocation to the old generation. After the counter variable has been initialized, the mutator thread proceeds with operation 222 in which the counter variable is updated by adding 1 to the counter value before an object is allocated in old generation memory 110 and subtracting 1 from the counter value after an object has been initialized in old generation memory 110. Note that a mutator thread can only perform one object initialization at a time. Thus, the value of the counter is always less than or equal to the number of mutator threads.

Still referring to FIG. 2B, in cooperation with the mutator thread, a separate garbage collection thread monitors the value of the counter of ongoing object initializations. In operation 230 the garbage collection thread tests the value of the counter of ongoing object initialization. If the counter value is 0, operation 232 commences in which garbage collection is allowed to proceed on a garbage-collecting task. The memory address referenced by the free space pointer at the time of garbage collection is used as the end of scan boundary in the old generation memory. If the counter value is not zero, operation 234 commences in which the garbage collection thread will wait a given time before returning back to operation 230. The garbage collection thread is typically a thread of a task which has requested a scavenge.

The mechanisms described above guarantee that garbage collection of the young generation of a task proceeds when all objects before the end of scan position are initialized. However, these mechanisms are sub-optimal in that the end of scan position may be well beyond the last object allocated by the threads of the task performing a garbage collection. In order to exactly set the end of scan position to the last object allocated by the threads of task before garbage collection, every thread notes in a thread-local storage area the value of the free pointer after a successful allocation to the old generation, in accordance with one embodiment of the present invention. This value is called the teos of the thread.

Figure 3A:
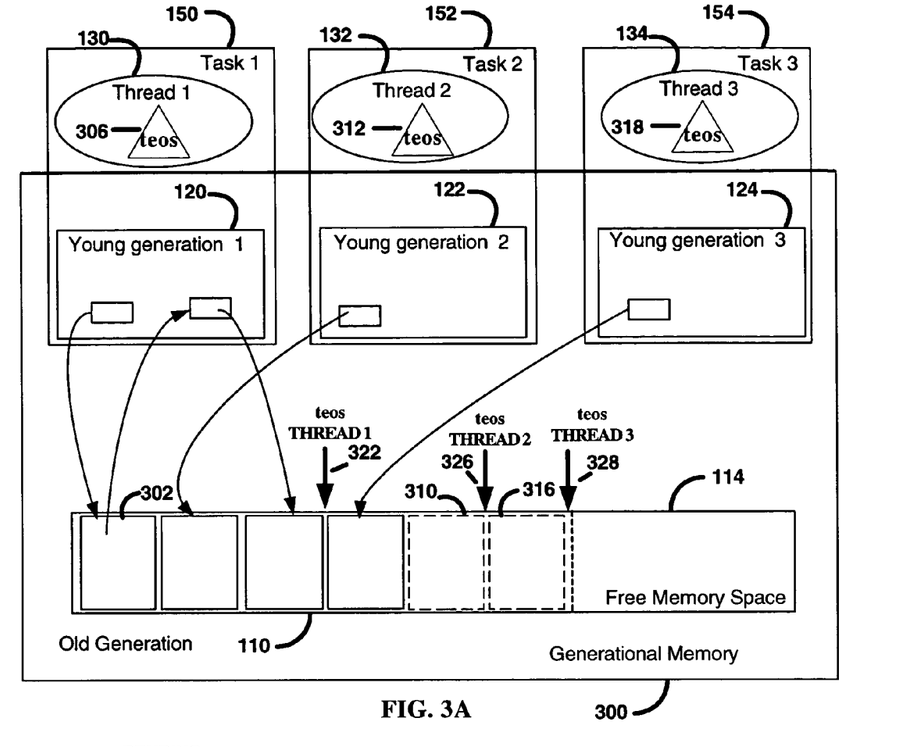
FIG. 3A is a conceptual diagram of a generational memory maintaining per thread a free pointer value of the old generation, in accordance with one embodiment of the present invention.

FIG. 3A is a conceptual diagram of a generational memory 300 which maintains per thread a teos. Generational memory 300 operates in cooperation with a multi-tasking implementation of a virtual machine which permits multiple tasks to be processed. It is understood that the multi-tasking virtual machine may be one of a plurality of virtual machines operating in a computer system. Generational memory 300 is divided into multiple young generation memories (120, 122, and 124), one for each running task, and old generation memory 110 shared between all tasks. Young generation memories 120, 122, and 124 and old generation memory 110 may each be located in a computer system's virtual or physical memory. Although FIG. 3A depicts a task having only a single thread, it should be understood that a task may have multiple threads associated with the task. An example of a teos is depicted by thread 130 containing teos 306. Teos 306 records memory address 322 after objects of thread 130 have been successfully allocated in old generation memory 110.

Figure 3B:
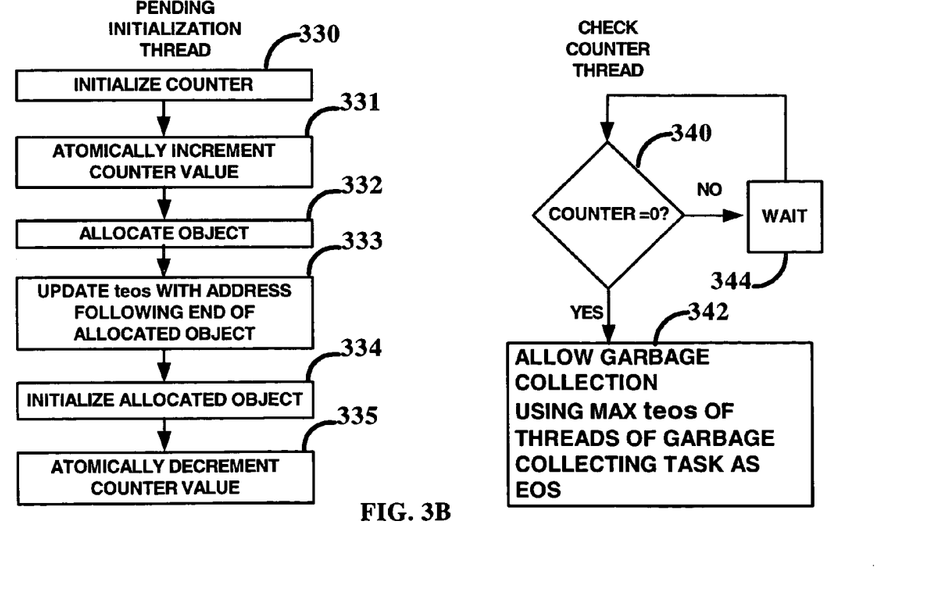
FIG. 3B is a flowchart detailing thread operations which regulate garbage collection on the generational memory of FIG. 3A, in accordance with one embodiment of the present invention.

FIG. 3B is a flowchart detailing thread operations which regulate garbage collection on generational memory 300. Old generation memory 110 is associated with a counter of ongoing initialization of allocated objects. The counter is initialized to 0 when the old generation memory is initialized, before any allocations to the old generation memory. A mutator thread updates the counter of the number of ongoing object initializations wherein the counter is incremented atomically just before allocating an object in the old generation, and decremented atomically just after the object initialization is completed. In operation 330, a counter variable which will contain a counter value representing the number of ongoing object initializations is initialized before any allocation to the old generation. After the counter variable has been initialized, the mutator thread proceeds with operation 331 in which the counter value is atomically incremented before an object is allocated in old generation memory 110. In operation 332 an object is allocated in the old generation memory 110. After the object is allocated, operation 333 can proceed in which the teos is updated with the memory address following the end of the allocated object. Next, in operation 334 initializes an allocated object. Note that a mutator thread can only perform one object initialization at a time. Thus, the value of the counter is always less than or equal to the number of mutator threads. After the allocated object is initialized, operation 335 proceeds in which the counter value is atomically decremented.

Once all threads of the collected task have stopped, the young generation GC iterates over all the threads of the collected task to find the maximum of all teos values. This maximum is subsequently used as the end-of-scan position. It should be understood that the young generation GC needs to iterate over the list of threads of the collected task regardless of this optimization in order to find roots of garbage collection from the execution stacks of threads. Calculating the end-of-scan position would typically take place at this time. New threads entering the system initialize their teos to 0 or any value smaller than the bottom of the old generation.

Referring back to FIG. 3B, in cooperation with the mutator thread, a separate garbage collection thread monitors the value of the counter of ongoing object initializations. In operation 340 the garbage collection thread tests the value of the counter of ongoing object initialization. If the counter value is 0, operation 342 commences in which garbage collection is allowed to proceed on a garbage-collecting task. The garbage collection thread first computes the end-of-scan position (eos) as the maximum of all teos values of the threads of the garbage collecting task. If the counter value is not zero, operation 344 commences in which the garbage collection thread will wait a given time before returning back to operation 340. The garbage collection thread is typically a thread of a task which has requested a scavenge.

The mechanisms described above compute an end of scan position that correspond exactly to the last object allocated by threads of a task before garbage collection of the young generation of the task, and further, guarantee that all objects before the end of scan position are initialized. The mechanisms however requires an atomic increment and decrement of a counter value at each object allocation, which substantially increases the cost of object allocation. In order to avoid the cost of these atomic operation on a counter value, each thread of a young generation memory can be augmented with local storage to record the address immediately after the last object fully initialized by the thread, called the lofi of the thread, according to one embodiment of the present invention. The lofi of a thread is initialized to 0 or any value greater or equal to the value used for initializing the teos of threads.

Whenever a thread completes the initialization of an object allocated in the old generation, it updates its lofi with the address of the object following the object just allocated. This address is obtained by adding the size of the initialized object to its address. However, in some implementations, the initialization of an object comprises zero-filling the object, which comprises increasing a pointer to each word of the object up to the end of the object. In this case, the address of the next object is already available and need not be computed specially, and recording the lofi adds a single store instruction to the object initialization path, a much lower overhead than the atomic increase/decrease of a counter of ongoing object initialization. It should be noted that a given thread can only allocate and initialize one object at a time. In other words, all objects are allocated by a thread t in the old generation before the address recorded in lofi(t) are fully initialized.

Figure 4A:
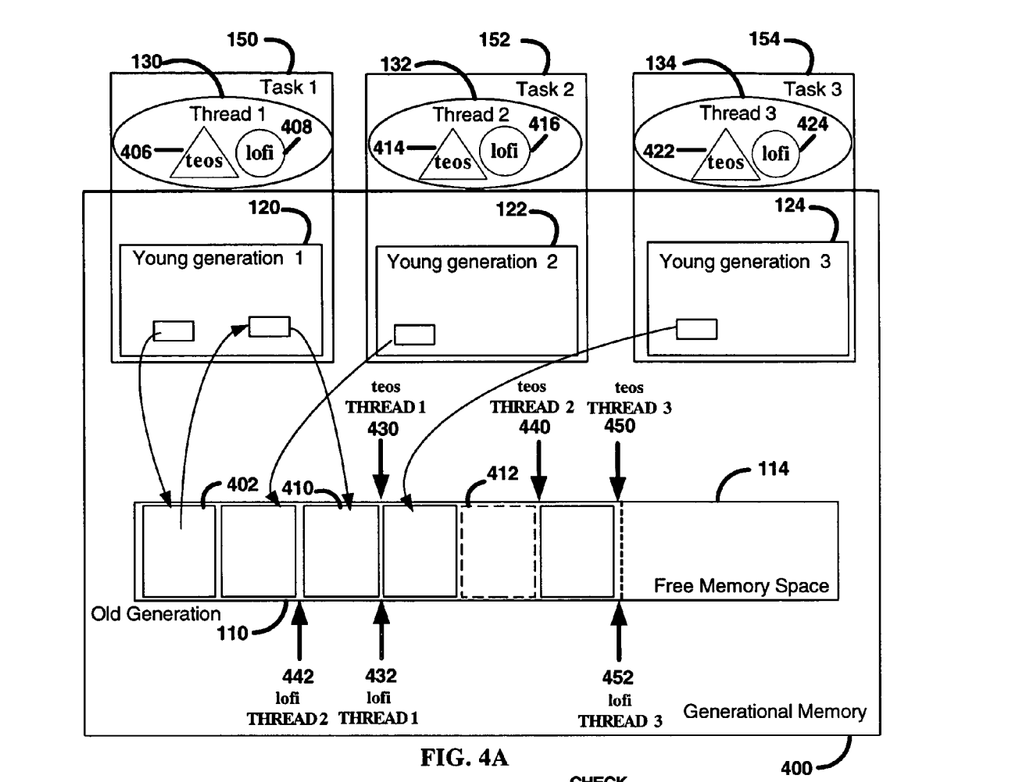
FIG. 4A is a conceptual diagram of a generational memory maintaining per thread both a free pointer value of the old generation and a record of an object address in the old generation, in accordance with one embodiment of the present invention.

FIG. 4A is a conceptual diagram of a generational memory 400 maintaining per thread both a teos and a lofi in accordance with one embodiment of the present invention. Generational memory 400 operates in cooperation with a multi-tasking implementation of a virtual machine which permits multiple tasks to be processed. It is understood that the multi-tasking virtual machine may be one of a plurality of virtual machines operating in a computer system. Generational memory 400 is divided into a plurality of young generation memories (120, 122, 124), one for each running task, and old generation memory 110 shared between all tasks. Young generation memories 120, 122, and 124 and old generation memory 110 may each be located in a computer system's virtual or physical memory. Although FIG. 4A depicts a task having only a single thread, it should be understood that a task may have multiple threads associated with the task.

Still Referring to FIG. 4A, thread 132 contains teos 414 and lofi 416. Teos 414 records memory address 440 which is the memory address after object 412 is allocated in old generation memory 110. Lofi 416 records memory address 442 which is the memory address after object 410 has been successfully initialized in old generation memory 110. Because object 412 has not been initialized, teos 414 records a memory address value greater than lofi 416. After object 412 has been initialized in old generation memory 110, both teos 414 and lofi 416 will record the same memory address value 440.

Figure 4B:
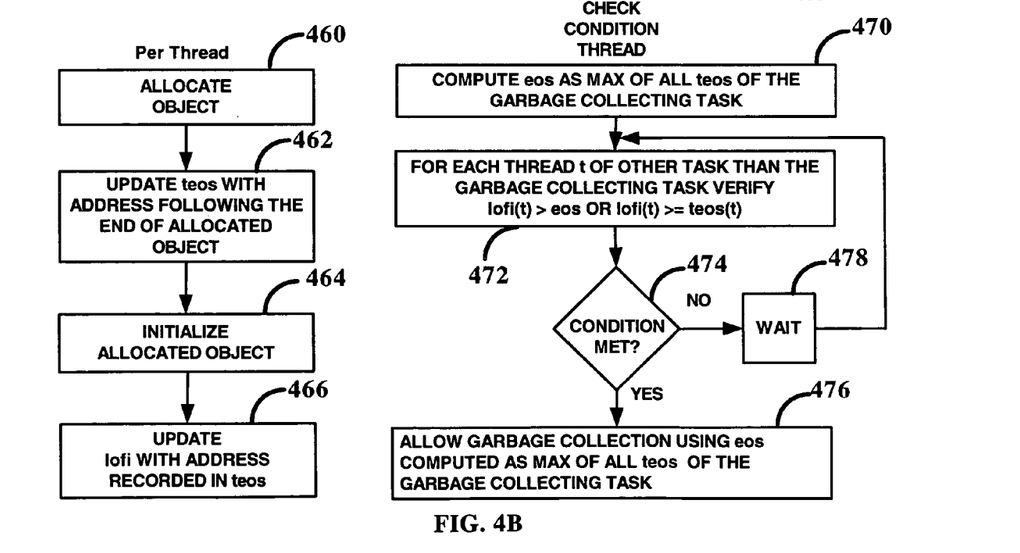
FIG. 4B is a flowchart detailing thread operations which regulate garbage collection on the generational memory of FIG. 4A, in accordance with one embodiment of the present invention.

FIG. 4B is a flowchart detailing thread operations which regulate garbage collection on generational memory 400, in accordance with one embodiment of the present invention. Each thread executing in a young generation memory maintains its own teos and lofi as long as the thread exists. In operation 460 an object is allocated in the old generation memory. After the object has been allocated in the old generation memory, operation 462 commences which updates the value of the teos of the thread with the address following the end of the allocated object. After the teos of the thread is updated, operation 464 proceeds which initializes the allocated object in the old generation memory through processes well understood by those skilled in the art. Finally, the lofi of the thread is updated in operation 466 with the address recorded in the teos. The process will repeat itself for each object which the thread allocates and initializes in the old generation memory.

Referring to FIG. 4B, a separate garbage collection thread monitors all mutator threads which are not associated with the garbage-collected task. In operation 470 the garbage collection thread first computes the end-of-scan position (eos) as the maximum of all teos values of the threads of the garbage collecting task. Next, in operation 472 and operation 474, a condition is evaluated for all threads (t) of non-garbage-collected tasks. If the condition $lofi(t) > eos \vee lofi(t) \geq teos(t)$ is satisfied for all threads (t) of non-garbage-collected tasks, operation 476 commences which permits garbage collection. If the condition is not satisfied, operation 478 commences in which the garbage collection thread will wait a given time before returning back to operation 472. The young generation GC may insert those threads into a list and wait for a short period of time either by yielding the CPU if the platform is a mono-processor, or running a busy loop testing the condition on the remaining threads.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method enabling concurrent garbage collection of a young generation of a task with other tasks executing in a multi-tasking virtual machine defined by one of a plurality of virtual machines operating in a computer system, comprising method operations of:
   providing a pointer for each of a plurality of threads of the task whose value references a free space memory address in an old generation memory which determines an end of scan value for the task before garbage collection of the young generation associated with the task, wherein the garbage collection preserves live objects in a memory of the virtual machine;
   maintaining the value of the pointer associated with each of the plurality of threads in a local storage area of each thread associated with the task, the value of the pointer defining a end of scan position of a last object allocated by each thread associated with the task in the old generation memory;
   providing a counter of the number of ongoing object initializations, the counter being atomically incremented before an object allocation in the old generation memory and atomically decremented after initialization of an object of the old generation memory; and
   regulating garbage collection of the young generation of the task while the other tasks of the multi-tasking virtual machine are executing, wherein the value of the pointer associated with the task and the counter are used in regulating the garbage collection of the young generation of the task based on the number of ongoing object initializations within the counter,
   wherein the end of scan position is defined by iterating over each of the plurality of threads of the task to determine a maximum value of the pointer, the maximum value of the pointer used as the end of scan position during garbage collection of the young generation of the task.

2. The method of claim 1, wherein garbage collection of the young generation of the task comprises:
   when the counter of ongoing object initializations has non-zero value,
   stopping all threads of a garbage-collecting task; and
   waiting for the counter of ongoing object initializations to have a zero value before starting garbage collection of the young generation of the task.

3. The method of claim 2, wherein the waiting for the counter of ongoing object initialization to have a zero value is configured to wait for a defined time.

4. A method for regulating garbage collection of a young generation of a task with other tasks executing in a multi-tasking virtual machine defined by one of a plurality of virtual machines operating in a computer system, comprising:
   providing a counter associated with a old generation of memory, the counter defining number of ongoing object initializations, the counter being incremented atomically before allocation of an object in the old generation memory and decremented atomically after initialization of the object;
   providing a pointer value for each of a plurality of threads associated with the task, the pointer value referencing a free space memory address in the old generation memory for a corresponding thread associated with the task, the free space memory address defined by an end of scan position of a last object allocated by the corresponding thread in the old generation memory;
   maintaining the pointer value associated with each of the plurality of threads in a local storage area of the corresponding thread of the task;
   monitoring the counter of ongoing object initializations to determine a number of partially initialized objects for the old generation memory; and
   performing the garbage collection using the pointer value for the task based on the counter while the other tasks of the multi-tasking virtual machine are executing, the pointer value defining an end of scan position of a last object allocated for the task wherein the garbage collection retains live objects in memory of the virtual machine,
   wherein performing the garbage collection further includes:
      computing a maximum end of scan position for the task by iteratively scanning each of the local storage area of the plurality of threads associated with the task; and
      executing garbage collection for the task using the maximum end of scan position, the garbage collection scanning the memory locations in the old generation memory up to the maximum end of scan position for the task.

5. The method of claim 4, wherein maintaining pointer value further includes,
   recording a end of scan (eos) memory address of an object after allocation of the object in the old generation memory;
   recording a last object fully initialized (lofi) memory address of the object by the thread after successful initialization of the object in the old generation memory; and maintaining the eos memory address and lofi memory address in a storage area local to the corresponding thread.

6. The method of claim 5, wherein computing a maximum end of scan position further includes:
   verifying that the eos memory address and lofi memory address recorded at each thread after object allocation and initialization are the same; and
   determining maximum value of one of the eos or lofi memory addresses associated with the plurality of threads, the maximum value of the eos or lofi defining the end of scan position used in the garbage collection.

7. The method of claim 4, wherein monitoring the counter further includes,
   waiting for a pre-determined period of time for the counter to have zero value when the counter has a non-zero value prior to performing the garbage collection.

* * * * *